United States Patent
Zhou et al.

(10) Patent No.: US 10,692,251 B2
(45) Date of Patent: Jun. 23, 2020

(54) EFFICIENT VARIANCE-REDUCED METHOD AND APPARATUS FOR MODEL-BASED ITERATIVE CT IMAGE RECONSTRUCTION

(71) Applicant: Toshiba Medical Systems Corporation, Otawara-shi (JP)

(72) Inventors: Jian Zhou, Buffalo Grove, IL (US); Zhou Yu, Wilmette, IL (US)

(73) Assignee: Canon Medical Systems Corporation, Otawara-shi (JP)

( * ) Notice: Subject to any disclaimer, the term of this patent is extended or adjusted under 35 U.S.C. 154(b) by 172 days.

(21) Appl. No.: 15/406,038

(22) Filed: Jan. 13, 2017

(65) Prior Publication Data

US 2018/0204322 A1 Jul. 19, 2018

(51) Int. Cl.
*G06T 11/00* (2006.01)

(52) U.S. Cl.
CPC ........ *G06T 11/006* (2013.01); *G06T 2210/41* (2013.01); *G06T 2211/424* (2013.01)

(58) Field of Classification Search
CPC ................ G06T 7/0012; G06T 11/003; G06T 2207/10081; G06T 2207/10116; G06T 2210/41
See application file for complete search history.

(56) References Cited

U.S. PATENT DOCUMENTS

| | | | | |
|---|---|---|---|---|
| 9,916,670 B1* | 3/2018 | Zhou | ...................... | A61B 6/025 |
| 9,959,640 B2* | 5/2018 | Koehler | ................ | G06T 11/008 |
| 2004/0234113 A1* | 11/2004 | Miga | ..................... | G06T 7/0012 |
| | | | | 382/128 |
| 2008/0055310 A1 | 3/2008 | Mitchell et al. | | |
| 2012/0155728 A1* | 6/2012 | DeMan | ................. | G06T 11/006 |
| | | | | 382/131 |
| 2013/0188847 A1* | 7/2013 | Zou | ........................ | G06T 5/002 |
| | | | | 382/131 |

(Continued)

OTHER PUBLICATIONS

Philippe P. Bruyant, "Analytic and Iterative Reconstruction Algorithms in SPECT", The Journal of Nuclear Medicine, vol. 43, No. 10, Oct. 2002, pp. 1343-1358.

(Continued)

*Primary Examiner* — Pinalben Patel
(74) *Attorney, Agent, or Firm* — Oblon, McClelland, Maier & Neustadt, L.L.P.

(57) ABSTRACT

A method and apparatus is provided to reconstruct a computed tomography image using iterative reconstruction combined with variance-reduced acceleration techniques. The acceleration techniques including: ordered subsets, separable quadratic surrogates, and Nesterov's acceleration. Ordered subset iteration is used, but instead of calculating a gradient of the objective function for only one subset per iteration, a full gradient of the total objective function is used. This decreases the variance and mitigates limit cycles. A correction term is calculated as the difference between the subset gradient and the full gradient, and this correction term is used when performing the update of the reconstructed image. The ordered subset can be combined with Nesterov's acceleration. To improve computational efficiency, the full gradient can be calculated once every T iterations, with negligible degradation to the convergence rate.

23 Claims, 12 Drawing Sheets

(56) References Cited

U.S. PATENT DOCUMENTS

| | | | | |
|---|---|---|---|---|
| 2013/0343673 | A1* | 12/2013 | Pal | G06T 11/003 |
| | | | | 382/298 |
| 2015/0030227 | A1* | 1/2015 | Liang | G06T 11/006 |
| | | | | 382/131 |
| 2016/0367212 | A1* | 12/2016 | Tang | A61B 6/5288 |
| 2017/0055930 | A1* | 3/2017 | Hagiwara | G06T 5/20 |
| 2017/0278281 | A1* | 9/2017 | Schmitt | G06T 7/0012 |
| 2017/0323436 | A1* | 11/2017 | Foland | G06T 15/205 |
| 2018/0336663 | A1* | 11/2018 | Zabic | G06T 11/006 |

OTHER PUBLICATIONS

Hung Nien, et al., "Relaxed Linearized Algorithms for Faster X-Ray CT Image Reconstruction", IEEE Transactions on Medical Imaging, vol. 35, No. 4, Apr. 2016, pp. 1090-1098.

Sangtae Ahn, et al., "Globally Convergent Image Reconstruction for Emission Tomography Using Relaxed Ordered Subsets Algorithms", IEEE Transactions on Medical Imaging, vol. 22, No. 5, May 2003, pp. 613-626.

Brendan O'Donoghue, et al., "Adaptive Restart for Accelerated Gradient Schemes", SVM Headerparse 0.2, Apr. 19, 2012, 17 pages.

Jeffrey A. Fessler, et al., "Conjugate-Gradient Preconditioning Methods for Shift-Variant PET Image Reconstruction", IEEE Transactions on Image Processing, vol. 8, No. 5, May 1999, pp. 688-699.

Sangtae Ahn, et al., "Convergent Incremental Optimization Transfer Algorithms: Application to Tomography", IEEE Transactions on Medical Imaging, vol. 25, No. 3, Mar. 2006, pp. 283-296.

\* cited by examiner

EFFICIENT VARIANCE-REDUCED METHOD AND APPARATUS FOR MODEL-BASED ITERATIVE CT IMAGE RECONSTRUCTION

FIELD

This disclosure relates to iterative reconstruction (IR) methods for reconstructing images in computed tomography (CT), the IR methods being performed using a combination of ordered subsets and/or Nesterov's acceleration, and, more particularly, to improved convergence rates for IR methods by reducing the variance when using the combination of ordered subsets and/or Nesterov's acceleration.

BACKGROUND

Computed tomography (CT) systems and methods are widely used, particularly for medical imaging and diagnosis. CT systems generally create images of one or more sectional slices through a subject's body. A radiation source, such as an X-ray source, irradiates the body from one side. At least one detector on the opposite side of the body receives radiation transmitted through the body. The attenuation of the radiation that has passed through the body is measured by processing electrical signals received from the detector.

A CT sinogram indicates attenuation through the body as a function of position along a detector array and as a function of the projection angle from the X-ray source to an X-ray detector. In a sinogram, the spatial dimensions refer to the position along the array of X-ray detectors. The time/angle dimension refers to the projection angle of X-rays, which changes as a function of time during a CT scan. The attenuation resulting from a portion of the imaged object will trace out a sine wave along the axis corresponding to the projection angle. Those portions farther from the axis of rotation correspond to sine waves with larger amplitudes, and the phase of the sine waves correspond to the angular positions around the rotation axis. Performing an inverse Radon transform—or any other image reconstruction method—reconstructs an image from the projection data represented in the sinogram.

Statistical iterative reconstruction (IR) algorithms in tomography can provide improved image quality at reduced dose levels relative to more conventional reconstruction methods like filtered back-projection (FBP). However, in certain implementations, the statistical approach is slow, requiring substantial computation time. To remedy the slow computationally intensive operation of standard statistical reconstruction approaches, improved methods using iterative algorithms for statistical reconstruction that converge more quickly in fewer iterations are gaining recognition.

Accelerator methods can be variously combined with IR methods, including ordered subsets (OS), and Nesterov's acceleration techniques. OS methods beneficially reduce the computational cost by using only a subset of the measurement data per iteration of the image reconstruction algorithm. Nesterov's acceleration method can also be used to improve computational efficiency and performance of the IR method. However, as described below for certain implementations, OS accelerated algorithms might not converge. For example, when combined with the Nesterov's acceleration, OS accelerated algorithms can suffer from divergence issues.

BRIEF DESCRIPTION OF THE DRAWINGS

A more complete understanding of this disclosure is provided by reference to the following detailed description when considered with the accompanying drawings, wherein.

DETAILED DESCRIPTION

Figure 1A:
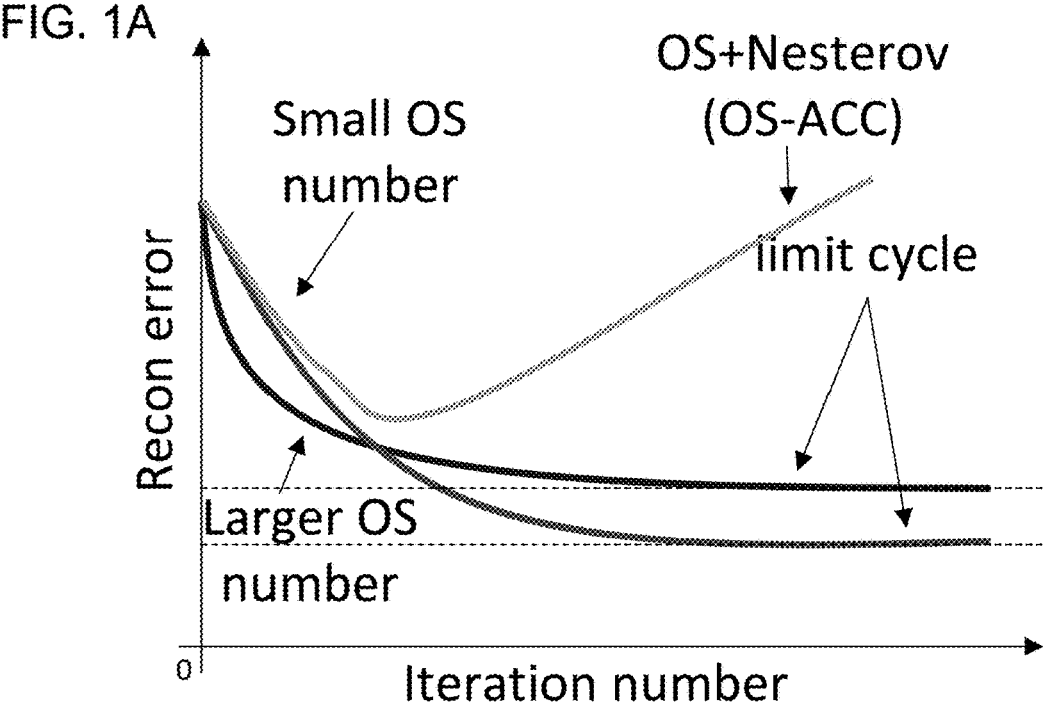
FIG. 1A shows a plot of convergence rates for iterative reconstruction (IR) methods using a small number of ordered subsets (OS), a large number of OS, and using a combination of OS with Nesterov's acceleration, according to one implementation.

Iterative reconstruction (IR) methods have gained considerable attention in X-ray CT imaging due to their superior image quality over conventional filtered backprojection (FBP) reconstruction methods. However, IR demands greater computational resources and time FBP due to, e.g., the use of complicated system forward models and iterated processing procedures. Algorithms with rapid convergence rates are thus highly beneficial in order to reduce iteration times without adversely affecting image quality.

Various iterative algorithms can be used to iteratively reconstruct CT images. These methods can include, e.g., gradient-based methods, iterative coordinate descent methods, and methods based on an optimization transfer. Additional methods can be based on an augmented Lagrange multiplier framework as well as the Bergman's splitting scheme.

Most of these algorithms still converge slowly due to the ill-posed nature of the tomographic reconstruction problem, thus acceleration techniques are advantageous in order to increase the convergence rate. In the gradient-based method, fast convergent algorithms can be used to achieve a Newton-type update, e.g., using the conjugate gradient method with some predefined preconditioners. Additionally, the ordered subsets (OS) method is another acceleration technique. One advantage of the OS acceleration is that it does not add extra algorithm complexity and hence can be readily combined with most existing algorithms. Also, in certain instances, Nesterov's momentum method can provide a quadratic convergence rate when applied with many of the existing iterative algorithms. A combination of two or more acceleration techniques, if done properly such as in the methods described herein, can result in further acceleration compared to either technique alone. For example, using the methods described herein, which combine a Nesterov's momentum method with an OS-based separable quadratic surrogate (SQS) method, can achieve a considerable reconstruction speedup.

One potential challenge that can limit the speedup is that OS-type algorithms often suffer from a limit cycle problem. When an OS-type algorithm is combined with a momentum method, its convergence rate becomes more complicated. In fact, as described below, in certain combinations, the OS-type algorithm can result in a divergent solution. The solution to this problem is suggested from an analysis based on the theory of stochastic gradient optimization methods, which indicates that, although the image error between the iterate and the final solution can decrease in a quadratic rate, the error due to the stochastic noise actually increases as a linear function of the iteration number. This stochastic noise can be referred to as the gradient approximation error, i.e., the mismatch between the gradient of original objective function and the gradient defined using only a single subset. Thus, a greater number of subsets results in a larger variance being accumulated, causing the divergence rate to increase along with the number of iterations.

One way around this problem is to use a relaxed momentum method in which the step-size decreases as the number of iterations increases. The relaxed momentum method introduces an additional parameter that handles the decreasing step-size, which can be challenging and often data dependent. Further, the decreasing step-size leads to slower convergence speed, and the control of diminishing step-size requires extra parameter tuning, which complicates the reconstruction work flow.

Other methods of addressing the convergence problem include step-size restarting schemes, classical gradient-based algorithms, and other globally convergent methods. Step-size restarting schemes can be used to control the divergence issue when using Nesterov's acceleration, but they cannot avoid the limit cycle issue. OS-type algorithms can be entirely avoided by using classical gradient-based algorithms such as a preconditioned conjugate gradient method. However, designing effective preconditioners can prove challenging, especially for wide-cone-angle image reconstruction. Other globally convergent methods such as the incremental optimization transfer algorithm can also be applied.

A better approach than those methods described above is the variance-reduced methods described herein. This better approach uses a variance reduction technique in combination with the OS-type algorithm and Nesterov acceleration in order to overcome the limit cycle and variance issues. Further, the methods described herein efficiently reduce the stochastic noise during the iterative reconstruction procedure while advantageously maintaining the optimal convergence rate. Moreover, the methods described herein advantageously do not need extra parameters.

In summary, fast iterative algorithm can help reduce overall reconstruction time without image degradation. In the methods described herein, a variance-reduced method is proposed to improve fast iterative reconstruction accelerated by ordered subset (OS) and Nesterov's momentum method. Without the improvements of the methods described herein, OS accelerated algorithms can be subject to limit cycles, prolonging convergence. When further combined with Nesterov's method, the algorithm often diverges due to noise accumulation. The methods described herein reduce this noise, thus enabling the convergence at a rapid rate, as demonstrated by the results described herein.

Referring now to the drawings, wherein like reference numerals designate identical or corresponding parts throughout the several views, FIG. 1A shows a plot of the reconstruction error as a function of the number of iterations. The iteration number is plotted along the horizontal axis. The reconstruction error, which is plotted along the vertical axis, represents the difference between the reconstructed image at a given iteration number and a reference image. The plots show the convergence using OS without Nesterov's acceleration. Further, these plots demonstrate that using a larger number of OS, the IR initially converges faster, but the limit cycle imposes a larger error limit for a large number of OS. Even worse than using the OS technique alone, after a given number of iterations, the combination of OS and Nesterov acceleration actually causes the reconstructed image to diverge from the reference image.

Thus, it can be observed that most IR algorithms converge slowly. Although algorithms using OS can be applied to accelerate the convergence speed, an OS accelerated algorithm might not converge because of the limit cycle issue, resulting in the divergence phenomenon shown in FIG. 1A. In essence, a large number of OS creates large limit cycle, i.e., it converges relatively fast in a few early iterations, but this convergence is ultimately limited by the relatively large error produced by the variance, resulting from using subsets rather than the entirety of the projection data during the iterations. When Nesterov acceleration is added to an IR method using OS, which is referred to as the OS-ACC algorithm, the error due to gradient mismatch can be accumulated during the iteration procedure. Further, the larger the number of subsets used, the bigger the mismatch error, such that the OS-SQS algorithm diverges more quickly.

Figure 1B:
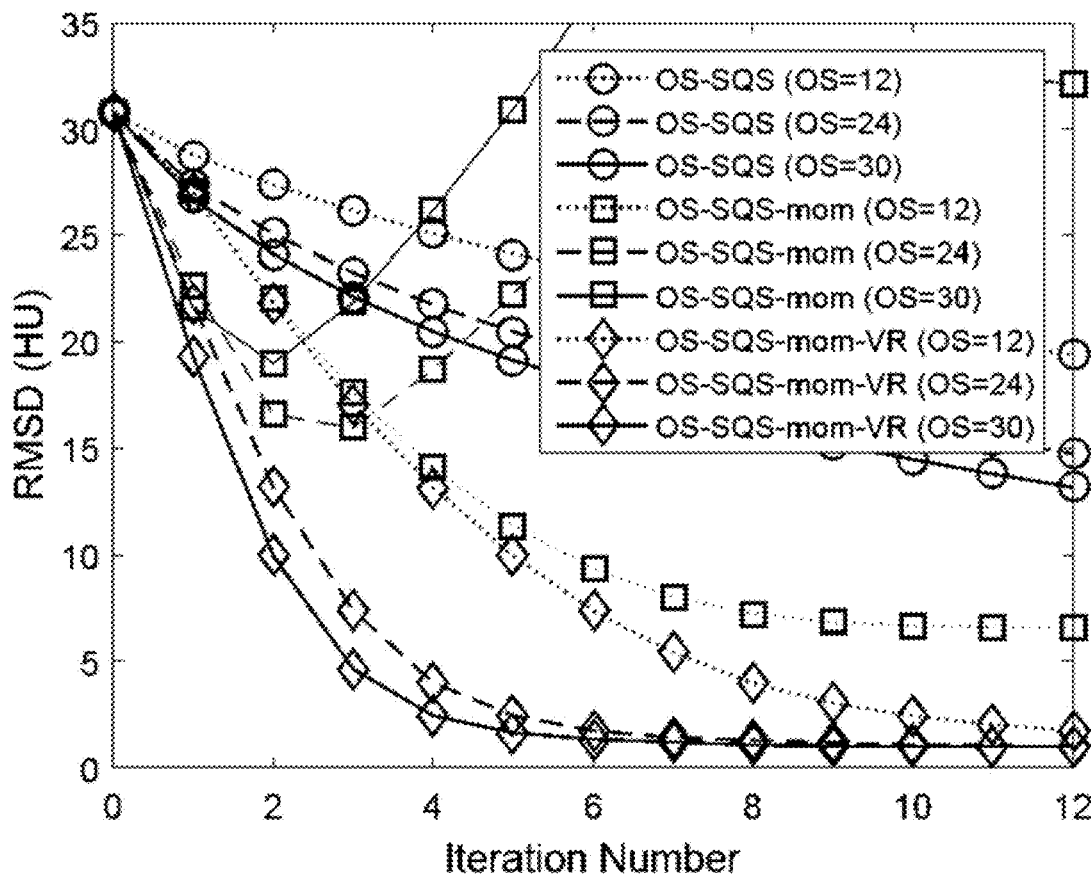
FIG. 1B shows a plot of simulation results for a convergence rate of various implementations of IR, according to one implementation.

FIG. 1B shows simulation results generated using actual data and exemplifying the limited convergence and divergence phenomena characterized above in the description of FIG. 1A. A more detailed description of the results in FIG. 1B is provided below after the "OS-SQS," "OS-SQS-mom," and "OS-SQS-mom-VR" algorithms are described.

In certain implementations, IR methods can be formulated to generate an image by minimizing an objective function for regularized weighted least square reconstruction, e.g., by solving the expression $$\hat{x} = \arg\min_{x \geq 0} \Phi(x), \Phi(x) \triangleq L(x) + \beta U(x) \text{ with}$$

$$L(x) \triangleq \frac{1}{2}(y - Px)^T W(y - Px),$$

wherein y is the projection data, x is the image being reconstructed, and P represents a forward projection operator. The matrix W can be a diagonal matrix in which the values along the diagonal are the statistical weights. The regularization function $U(\bullet)$ is multiplied by a regularization parameter $\beta$, which adjusts the strength of the regularization term. Finally, the symbol T denotes matrix or vector transpose.

When the OS technique is applied, the projection data is partitioned into N (N>0) non-overlapped subsets. For each subset, a partial objective function can be defined as $$\Phi_n(x) \triangleq L_n(x) + \beta U(x) \text{ with}$$

$$L_n(x) \triangleq \frac{N}{2}(y_n - P_n x)^T W_n(y_n - P_n x),$$

wherein $A_n$ is the nth subset of A. Often $\Phi_n(x) \approx \Phi(x)$, $\forall n$. The total objective function $\Phi(x)$ is the average of the constituent subset objective functions $\Phi_n(x)$, i.e., $$\Phi(x) = \frac{1}{N}\sum_n \Phi_n(x).$$

OS-based iteration is performed by first minimizing $\Phi_n(x)$ to get $x^{k+1}$ ($x^{k+1}$ might not be necessarily the exact minimizer). Then $x^{k+1}$ can be used as the initial image for solving the next function $\Phi_{n+1}$ defined on subset n+1. This procedure is repeated and the minimizer of the last subset can be fed into the first subset to start a new round of iteration over each of the subsets.

The OS scheme can result in speedup of factor N. However, the algorithm accelerated using OS can cease converging as it approaches an error limit imposed by the limit cycle effect. One explanation from the theory of stochastic gradient methods is that the error (or the variance) $E_n(\|\nabla\Phi_n(x) - \nabla\Phi(x)\|^2)$ becomes large and therefor prevents convergence, wherein the subset number n has been treated as a random variable and $E_E(\bullet)$ is the expectation operator on n. If the number of subsets increases, the variance $E_n(\bullet)$ also increases, leading in turn to slower convergence (as well as a larger limit cycle).

To overcome this challenge, a variance-reduced method is used. The variance-reduced method uses a surrogate for $\nabla\Phi_n(x)$, denoted by $\xi_n$, such that $E_n(\|\xi_n - \nabla\Phi(x)\|^2)$ can become much smaller than $E_n(\|\nabla\Phi_n(x) - \nabla\Phi(x)\|^2)$ as the algorithm iterates. For example, in certain implementations, the surrogate function for the $n^{th}$ subset can be expressed as $$\tilde{\Phi}_n(x) \triangleq \Phi_n(x) - (\nabla\Phi_n(x) - \mu)^T x$$

wherein $\mu = \nabla\Phi(\tilde{x})$ and $\tilde{x}$ can be an intermediate image. This surrogate is consistent with the above formulation as observed by the fact that $$\sum_n \tilde{\Phi}_n(x) = \sum_n \Phi_n(x) = \Phi(x), \text{ and}$$

$$E_n(\nabla\tilde{\Phi}_n(x)) = E\{\nabla\Phi_n(x) - (\nabla\Phi_n(\tilde{x}) - \mu)\}(\nabla\tilde{\Phi}_n(x))$$
$$= E_n\{\nabla\Phi_n(x)\} = \nabla\Phi(x),$$

wherein the second equality is due to the fact that $E_n\{\nabla\Phi_n(\tilde{x})\} = \nabla\Phi(\tilde{x}) = \mu$. This implies that the surrogate function is unbiased, and, therefore, does not alter the original objective function.

The choice of $\xi_n \triangleq \nabla\tilde{\Phi}_n(x)$ can greatly reduce the variance. Intuitively, this can be understood by considering the case when $\tilde{x}$ converges to the estimate $\hat{x}$, such that $\mu \to 0$. This in turn results in $$\nabla\Phi_n(\tilde{x}) \to \nabla\Phi_n(\hat{x}), \text{ and}$$

$$\nabla\Phi_n(x^k) - \nabla\Phi_n(\tilde{x}) + \mu \to \nabla\Phi_n(x^k) - \nabla\Phi_n(\hat{x}).$$

If $x^k$ also converges to $\hat{x}$, then $\nabla\Phi_n(x^k) - \nabla\Phi_n(\hat{x}) \to 0$, which indicates that the error due to the gradient approximation can be reduced.

Figure 2:
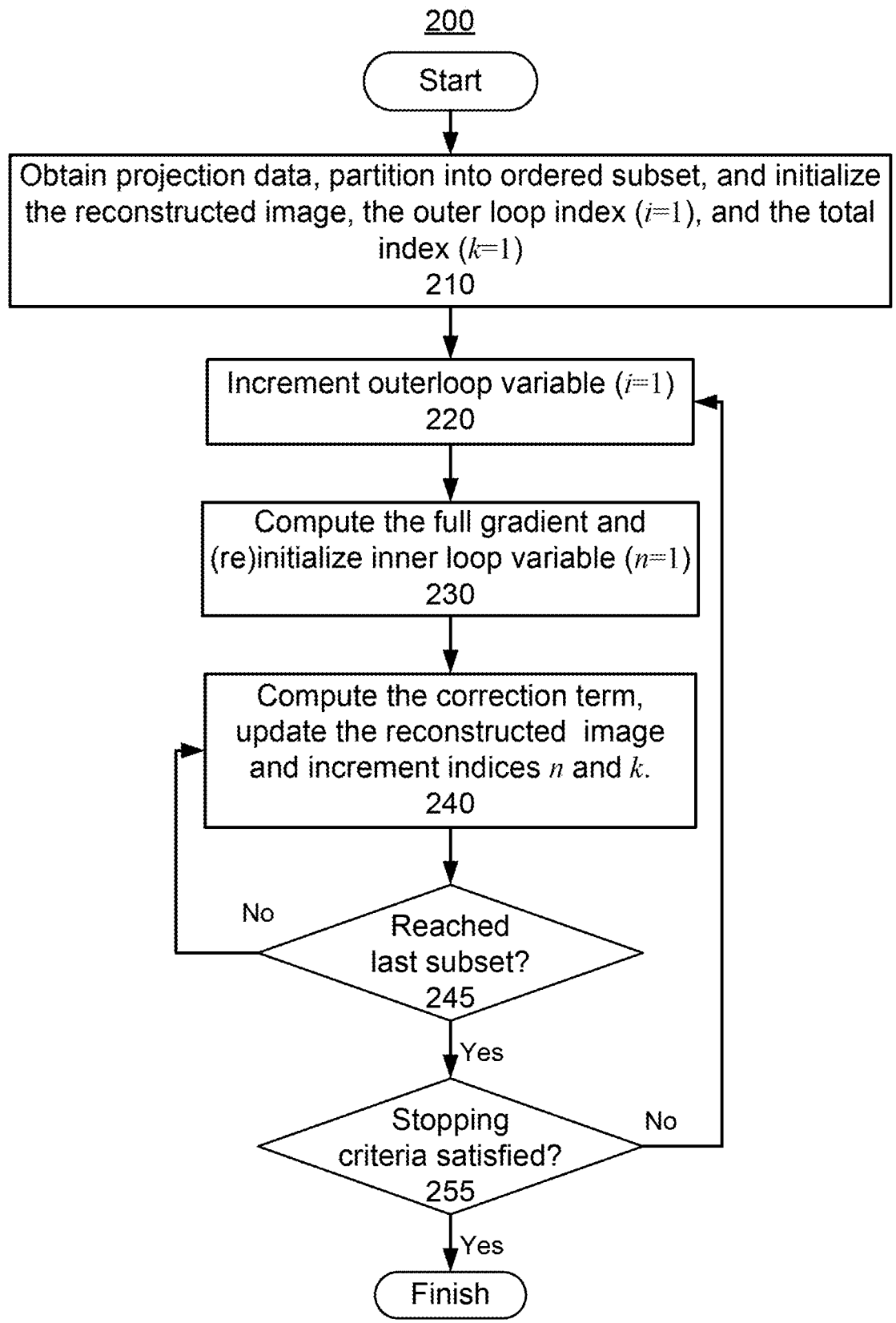
FIG. 2 shows a flow chart of a variance reduced OS IR method, according to one implementation.

FIG. 2 shows a flow diagram of a method 200 to perform IR using OS with reduced variance. The variance-reduced method 200 reduces the noise caused by the limit cycle. This reduction is achieved by computing a full gradient (the gradient based on all views) based on an intermediate image. The full gradient is then used to construct a correction term by taking the difference between the subset gradient and the full gradient. The image update is performed using the corrected gradient for each subset. Advantageously, the variance-reduced method 200 can be generally applied to any OS-type reconstruction algorithm. Further, method 200 can preserve the convergence rate of the original OS-type algorithm, and does not require additional parameters.

In step 210 of method 200, the projection data y is obtained and arranged into OS. Additionally, the reconstructed image and the loop variables are initialized. For example, the initial reconstructed image can be obtained using FBP, a Feldkamp reconstruction method, or any other known method for initializing a reconstructed image.

In step 220 of method 200, the outer-loop variable is incremented.

In step 230 of method 200, the full gradient $\mu$ is calculated (e.g., $\mu \leftarrow \nabla\Phi(\tilde{x})$) and the inner-loop variable is initialized/reinitialized to its starting value.

In step 240 of method 200, the correction term $c^k$ is calculated (e.g., $c^k \leftarrow \nabla\Psi_n(\tilde{x}) - \mu$). Further, the image $x^k$ is updated according to the expression $$x^{k+1} \leftarrow f(x^k, \nabla\Psi_n(x^k), c^k).$$

In certain implementations, the image update method uses a separable quadratic surrogate algorithm, such that $f(\bullet)$ is expressed as $$f(x^k; \nabla\Psi_n(x^k), c^k) = [x^k - D^{-1}(\nabla\Psi_n(x^k) - c^k)]_+$$

wherein $D = \text{diag}\{A^T W A 1\}$ and $[\bullet]_+$ is an operator that sets any negative value to zero. Additionally, in certain implementations, Nesterov's acceleration can be combined with the variance-reduced method 200, such that, the subset-based image update can be performed by the calculations $$t_{k+1} \leftarrow \frac{1}{2}\left(1 + \sqrt{1 + 4t_k^2}\right); x^{k+1} \leftarrow [x^k - t_k D^{-1}(\nabla\Psi_n(z^k) - c^k)]_+;$$

-continued $$v^{k+1} \leftarrow [v^k - t_k D^{-1}(\nabla \Psi_n(z^k) - c^k)]_+; \text{ and}$$

$$z^{k+1} \leftarrow \left(1 - \frac{1}{t_{k+1}}\right)x^{k+1} + \frac{1}{t_{k+1}}v^{k+1};$$

wherein the respective variables are originally initialized in step 210 as $t_0=1$ and $z^0=v^0=x^0$. Additionally, $x^0$ is the initial reconstructed image from step 210. Finally, in step 240, the loop variables n and k are incremented.

In step 245 of method 200, an inquiry is performed to determine whether the inner loop has incremented through each of the subsets. Step 240 is repeated until the last subset. At which point, the reconstructed image $\tilde{x}$ is updated to acquire the value of the final order subset image $x^k$, i.e., $\tilde{x} \leftarrow x^k$.

In step 255 of method 200, an inquiry is performed to determine whether the stopping criteria for the outer loop has been satisfied. For example, the outer-loop stopping criteria can include a determination whether the reconstructed image has adequately converged, and/or whether a maximum number of iterations has been reached. When the stopping criteria has not been reached, method 200 proceeds from step 255 to step 220. Otherwise, method 200 is complete.

Figure 3:
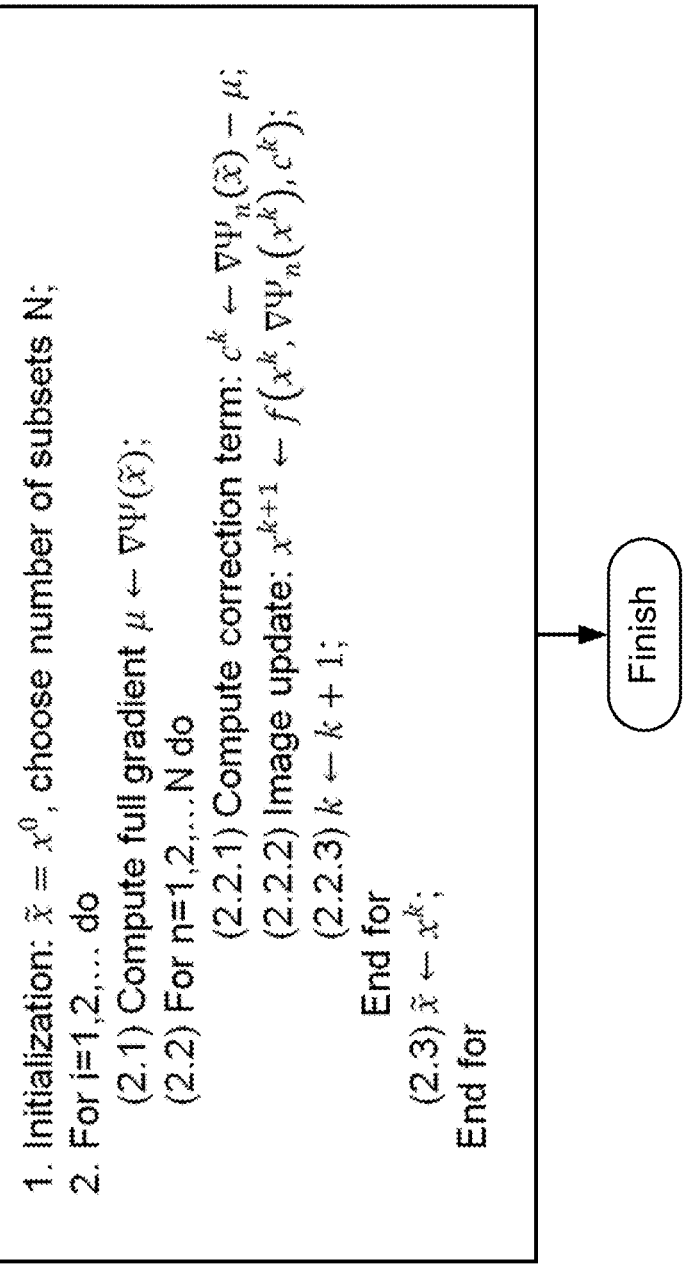
FIG. 3 shows a flow chart with pseudo code of a variance reduced OS IR method, according to one implementation.
Figure 4:
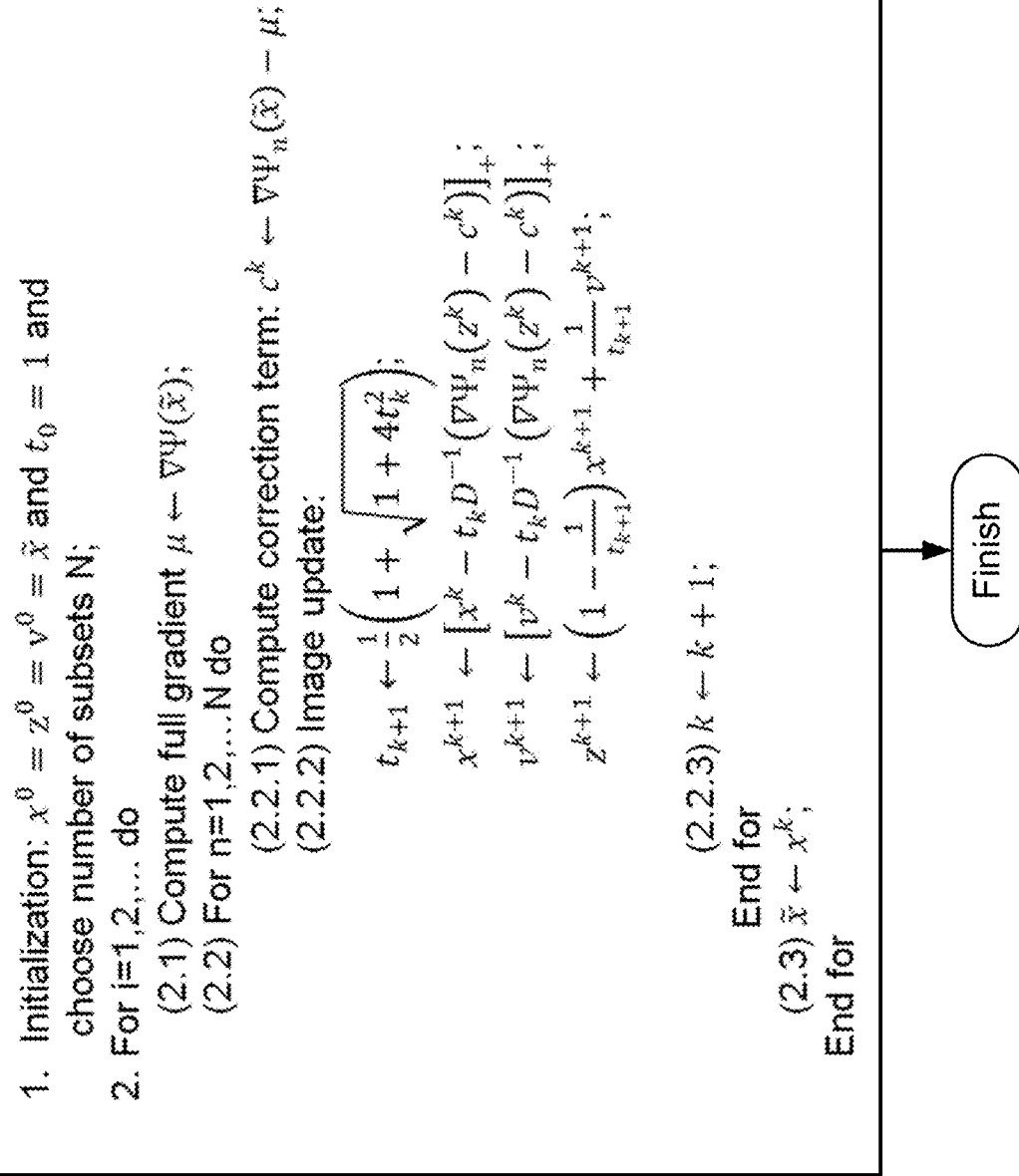
FIG. 4 shows a flow chart with pseudo code of a variance reduced OS IR method with Nesterov's acceleration, according to one implementation.

FIGS. 3 and 4 show various implementations of method 200 expressed using pseudo code. FIG. 3 shows that if the separable quadratic surrogate algorithm is applied in method 200, the update (2.2.2) $f(\cdot)$ becomes $$f(x^k;\nabla\Psi_n(x^k),c^k)=[x^k - D^{-1}(\nabla\Psi_n(x^k)-c^k)]_+,$$

wherein $D=\text{diag}(\{A^T WA1\})$ and $[\cdot]_+$ sets any negative value to zero. The implementation of method 200 shown in FIG. 3 is referred to as OS-SQS-VR, which stands for variance reduced OS-SQS.

Relatedly, FIG. 4 shows that if Nesterov acceleration is applied with the variance-reduced method 200, the subset-based image update (2.2.2) can be described a $$t_{k+1} \leftarrow \frac{1}{2}\left(1 + \sqrt{1+4t_k^2}\right); x^{k+1} \leftarrow [x^k - t_k D^{-1}(\nabla \Psi_n(z^k) - c^k)]_+;$$

$$v^{k+1} \leftarrow [v^k - t_k D^{-1}(\nabla \Psi_n(z^k) - c^k)]_+; \text{ and}$$

$$z^{k+1} \leftarrow \left(1 - \frac{1}{t_{k+1}}\right)x^{k+1} + \frac{1}{t_{k+1}}v^{k+1},$$

wherein $t_0=1$, $z^0=v^0=x^0$. The implementation of method 200 shown in FIG. 4 is referred to as the OS-SQS-mom-VR algorithm, which stands for variance reduced OS-SQS method including Nesterov's acceleration.

Method 200 can apply a combined OS-SQS algorithm. In certain implementations, the OS-SQS algorithm uses the subset surrogate function $$Q_n(x;x^k) \triangleq \Phi_n(x^k) \nabla\Phi_n(x^k)^T (x-x^k) - \frac{1}{2}(x-x^k)D(x-x^k).$$

The diagonal matrix D is positive definite, and is selected to satisfy the constraints $$Q(x;x^k) \geq \Phi(x) \text{ and } \nabla Q(x^k;x^k) = \nabla\Phi(x^k), \forall x.$$

To apply the variance reduced method, a quadratic surrogate function is constructed for $\tilde{\Phi}_n(x)$, according to $$\tilde{Q}_n(x;x^k) \triangleq Q_n(x;x^k) - (\nabla\Phi_n(\tilde{x})-\mu)^T x. \sim Q$$

The minimizer of this surrogate function can be $$x^{k+1}=[x^k-D^{-1}(\nabla\Phi_n(x^k)-\nabla\Phi_n(\tilde{x})+\mu)]_+.$$

Similarly, Nesterov's acceleration can be incorporated, as described above. There are multiple choices for $\tilde{x}$. For example, the image output after one loop of subset iterations can be used as an update of $\tilde{x}$.

The image update equation, $$x^{k+1}=[x^k-D^{-1}(\nabla\Phi_n(x^k)-\nabla\Phi_n(\tilde{x})+\mu)]_+,$$

is computed using the difference between the two subset-based gradients $\nabla\Phi_n(x^k)$ and $\nabla\Phi_n(\tilde{x})$. However, by expanding the gradient, it can be observed that $$\nabla\Phi_n(x^k) - \nabla\Phi_n(\tilde{x}) = \nabla L_n(x^k) - \nabla L_n(\tilde{x}) + \beta(\nabla U(x^k) - \nabla U(\tilde{x})$$

$$= P_n^T W_n P_n(x^k - \tilde{x}) + \beta(\nabla U(x^k) - \nabla U(\tilde{x}),$$

which shows that the calculation can be performed using one subset forward projection and one backprojection. Additionally, the full gradient includes the gradient of the regularization at $\tilde{x}$, which is independent of the subset number. Therefore, the gradient $\nabla U(\tilde{x})$ is not needed if only $\mu^L = \nabla L(\tilde{x})$ is computed for each iteration, in which case $$\nabla\Phi_n(x^k) - \nabla\Phi_n(\tilde{x}) + \mu = \nabla\Phi_n(x^k) - \nabla L_n(\tilde{x}) + \mu^L$$

$$= P_n^T W_n P_n(x^k - \tilde{x}) + \beta\nabla U(x^k) + \mu^L.$$

Thus, the OS-SQS algorithm with the variance reduction is equivalent to the complexity of the OS-SQS algorithm without the variance reduction.

One challenge associated with the variance-reduced method 200 is that the evaluation of the full gradient μ (as well as $\mu^L$) is computationally lengthy. Calculating μ can be performed using one full forward projection and one full backprojection, and hence this calculation can use significant computational resources. In certain implementations, it can be assumed that the full gradient calculated during one iteration remains a close approximation to the full gradient that would be calculated during the following iteration and even for several iterations after that. However, as changes to the reconstructed image $\tilde{x}$ compound with each subsequent iteration, the full gradient calculated during the earlier iteration less closely approximates the full gradient of the current iteration, and at some point the full gradient needs to be recalculated in order to keep the variance from becoming too large. Thus, even if the full gradient is not calculated and updated each iteration of the outer loop (i.e., the loop tracked by the index i in FIGS. 3 and 4), it can be assumed that the correction effect of the full gradient persists, albeit to a lesser degree, even when the full gradient is updated less often than each iteration of the outer loop. Thus, rather than updating μ on each iteration, in certain implementations, the full gradient update is performed only periodically every T iterations, wherein T can be a predefined integer greater than one.

Returning to FIG. 1B, the advantages of the OS-SQS algorithm over the OS-SQS algorithm (i.e., ordered-subsets with separable quadratic surrogates) and the OS SQS mom algorithm (i.e., OS-SQS algorithm with "Nesterov's acceleration) can be observed. FIG. 1B demonstrates the efficiency of the proposed reconstruction algorithm using real clinical circular 320-slice abdomen scan acquired using a Toshiba AqONE scanner. To evaluate the convergence rate within a region-of-interest (ROI), the HU-based root mean square difference (RMSD) is computed between the image of a given iteration and a converged image $\hat{x}$ (i.e., the reference image), the RMSD is given by $$RMSD(HU) \frac{\|x_{ROI}^k - \hat{x}_{ROI}\|}{\sqrt{|ROI|}}$$

wherein |ROI| means the number of voxels inside the ROI. The regularization used in the objective function is given by $$U(x) = \sum_{l \in N_j} w_{ij} \phi(x_j - x_l)$$

wherein $N_j$ represents the neighborhood of voxel j, the expression $\phi(t)$ is defined as $\phi(t) = \sqrt{t^2 + \delta^2}$, and $\delta$ is a predefined constant. The weight $w_{ij}$, can calculated using an inverse distance between voxel j and voxel i. The converged image $\hat{x}$ was obtained by executing 10,000 iterations of an SQS algorithm with only one subset, and the initial image was generated using FBP reconstruction.

In FIG. 1B, different numbers of subsets (OS=12, 24 and 30) were sued to evaluate the convergence rate of the various IR methods. It can be observed that the use of a large number of subsets increases the initial convergence rate, but the speedup is limited. With Nesterov's acceleration, the OS-SQS-mom converges very fast initially. This can be observed, for example, by comparing OS-SQS (OS=12) with OS-SQS-mom (OS=12). Due to the limit cycle, however, the RMSD for OS=12 with Nesterov's acceleration ceases to decrease in after about ten iterations. When OS=24 is used, OS with Nesterov's acceleration diverges after about three iterations. More subsets create a larger limit cycle, and the divergence becomes even more pronounced.

By adding the variance reduction scheme described herein, method 200 performs much better than the OS-SQS-mom algorithm. When OS=12, the OS-SQS-mom-VR algorithm performs similarly to the OS-SQS-mom algorithm using a small number of iterations. However, as the number of iterations becomes large, the OS-SQS-mom-VR algorithm, unlike the OS-SQS-mom algorithm, generates a continuous decrease in the RMSD, rather than converging to a rather substantial error limit. This demonstrates that method 200 avoids the limit cycle issue by reducing the variance, leading to a solution closer to the true image represented by the reference image. Similarly when the number of subsets increases, method 200 does not appear to be adversely affected by the limit cycle. As shown in FIG. 1B, the RMSD decreases without divergence, even for a large number of subsets. Accordingly, method 200 eventually converges to much lower RMSD than the error limit achieved for OS-SQS-mom (OS=12).

Figure 5:
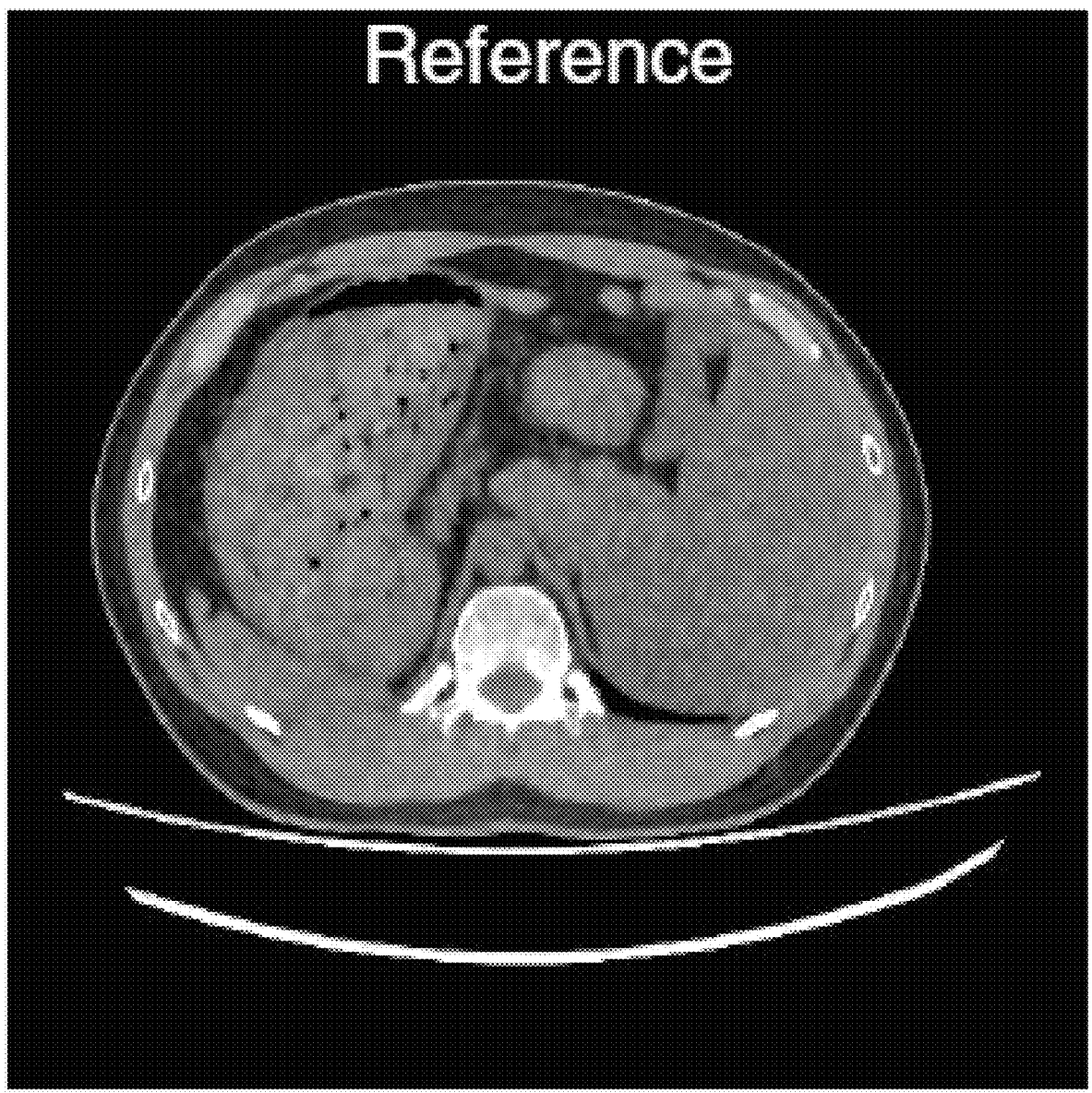
FIG. 5 shows a reference reconstructed image of an abdominal section.
Figure 6A:
FIG. 6A shows a reconstructed image, corresponding to the reference shown in FIG. 5, after six iterations using a combination of ordered-subsets with separable quadratic surrogates (OS-SQS) and using 24 subsets.
Figure 6B:
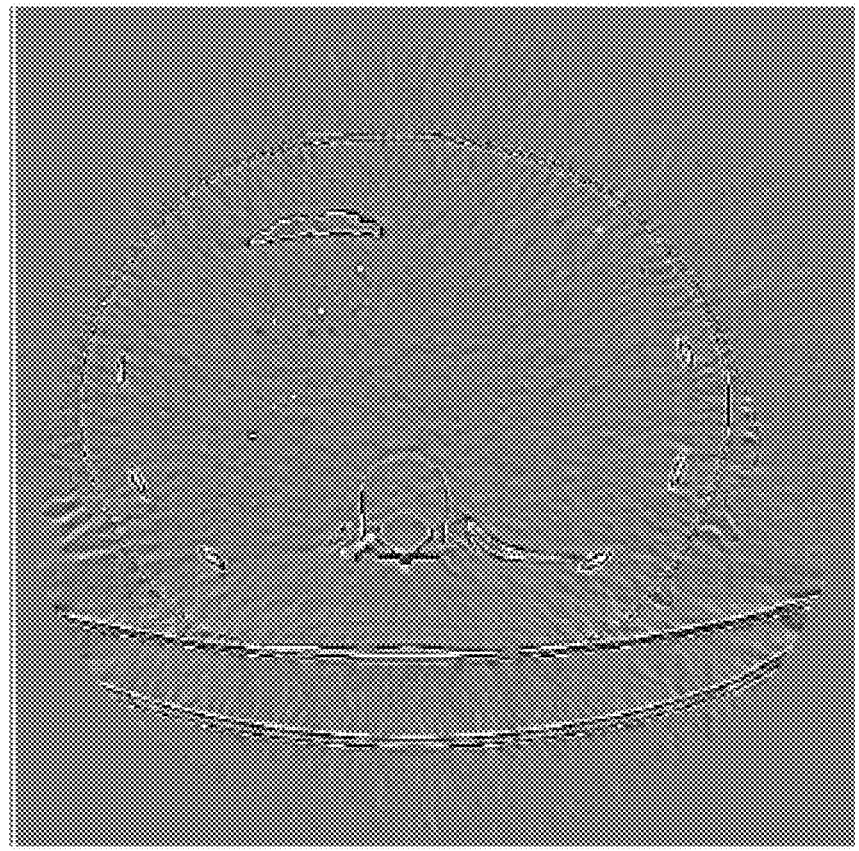
FIG. 6B shows a difference image of a difference between the reference image in FIG. 5 and the reconstructed image in FIG. 6A.
Figure 7A:
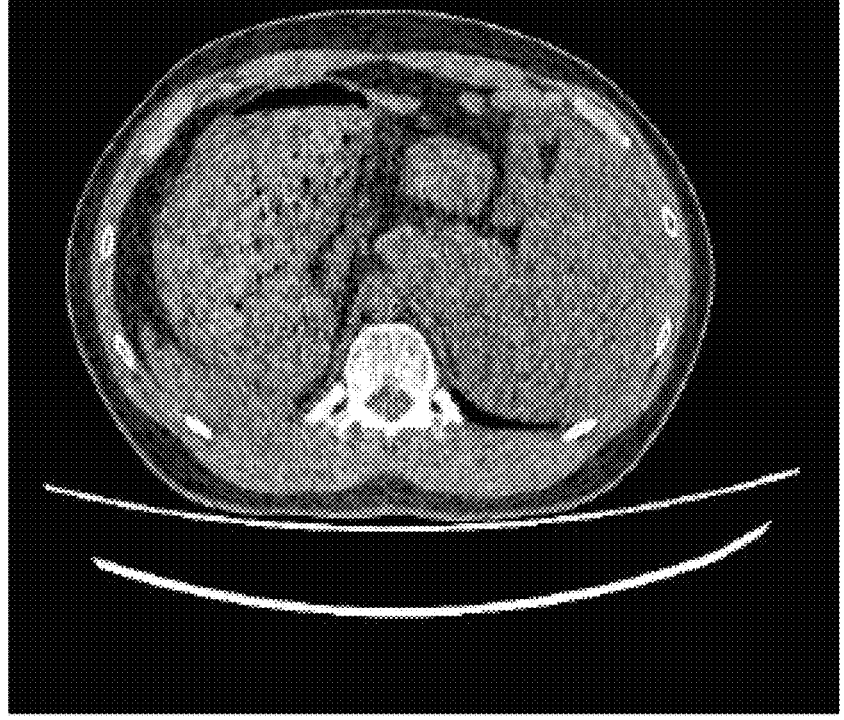
FIG. 7A shows a reconstructed image, corresponding to the reference shown in FIG. 5 after six iterations using a combination of ordered subsets with separable quadratic surrogates and Nesterov's acceleration (OS-SQS-mom) and using 24 subsets.
Figure 7B:
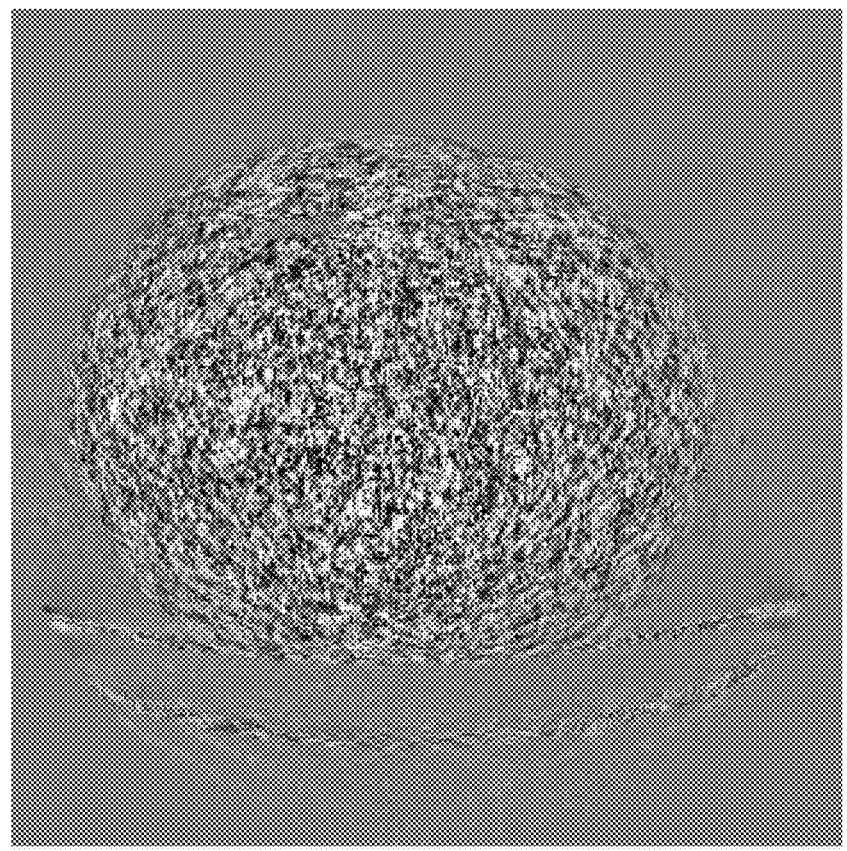
FIG. 7B shows a difference image of a difference between the reference image in FIG. 5 and the reconstructed image in FIG. 7A.
Figure 8A:
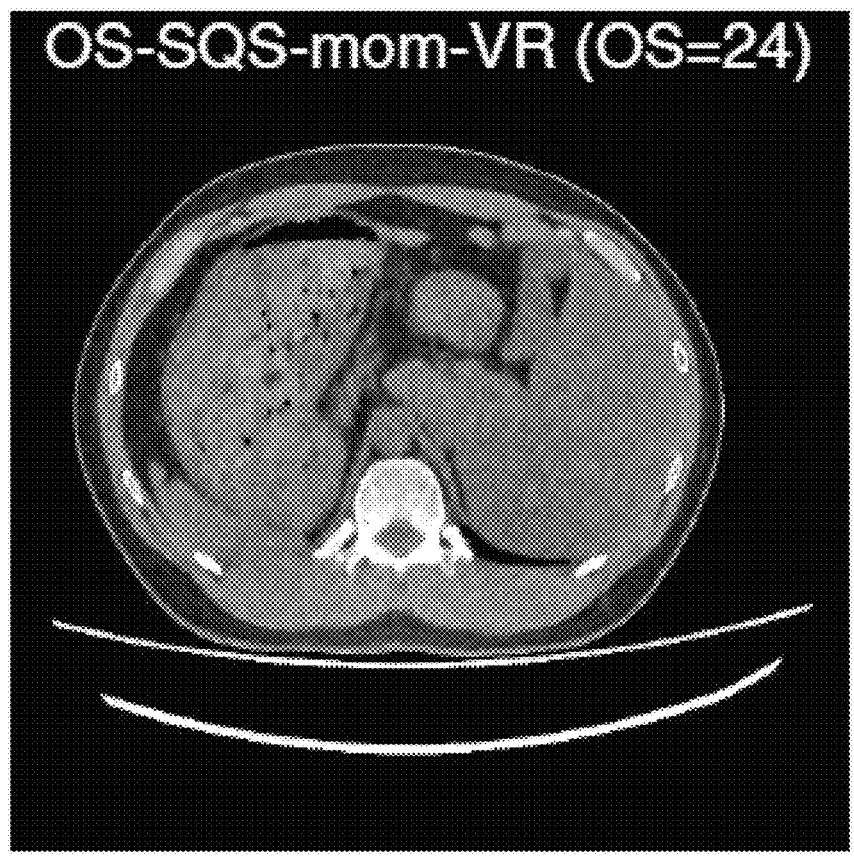
FIG. 8A shows a reconstructed image, corresponding to the reference shown in FIG. 5 after six iterations using a combination of ordered subsets with a variance reduction together with separable quadratic surrogates and Nesterov's acceleration (OS-SQS-mom-VR) and using 24 subsets.
Figure 8B:
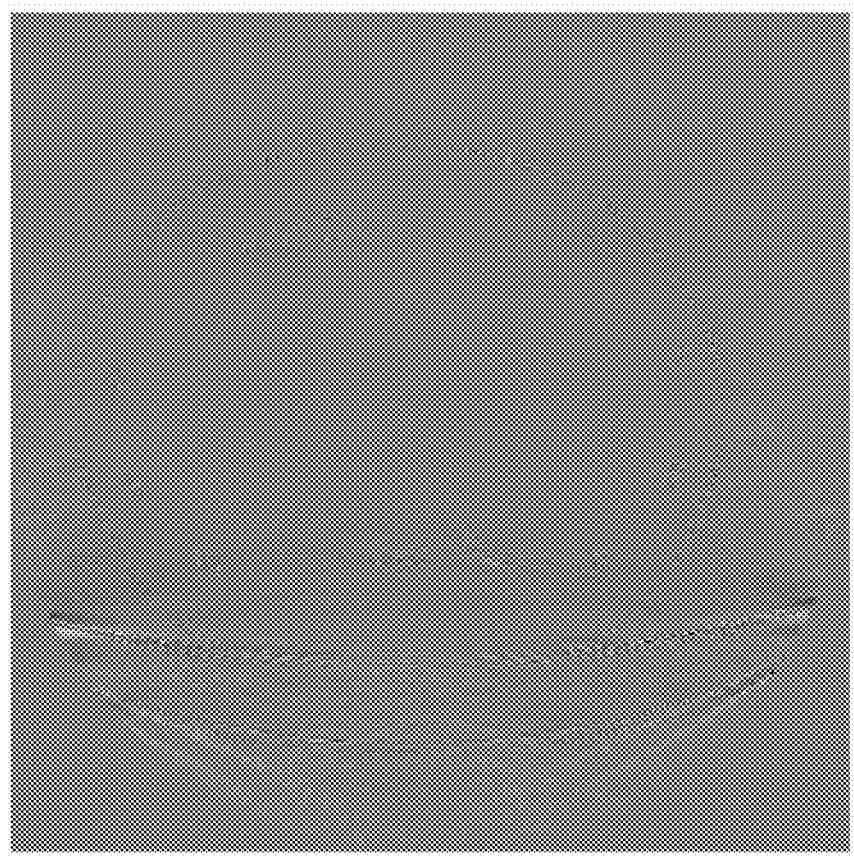
FIG. 8B shows a difference image of a difference between the reference image in FIG. 5 and the reconstructed image in FIG. 8A.

FIG. 5 shows the reference image, which was generated using 10,000 iterations of the SQS algorithm with OS=1. FIGS. 6A, 7A, and 8A show the reconstructed images at the 6th iteration for respective methods shown in FIG. 1B, i.e., FIGS. 6A, 7A, and 8A correspond respectively to method OS-SQS (OS=24), method OS-SQS-mom (OS=24), and method OS-SQS-mom-VR (OS=24). FIGS. 6B, 7B, and 8B respectively show the difference images between the reference image shown in FIG. 5 and the images shown in FIGS. 6A, 7A, and 8A, respectively. These difference images demonstrate that the OS-SQS method with 24 subsets does not fully converge by six iterations. Clearly, significant structure and detail are noticeable in FIG. 6B, as well as many high-frequency features. The image reconstructed using the OS-SQS-mom algorithm also shows significant noise, resulting from the divergence. On the other hand, method 200 using an OS-SQS-mom-VR algorithm exhibits negligible differences from the reference image after only 6 iterations.

Figure 9A:
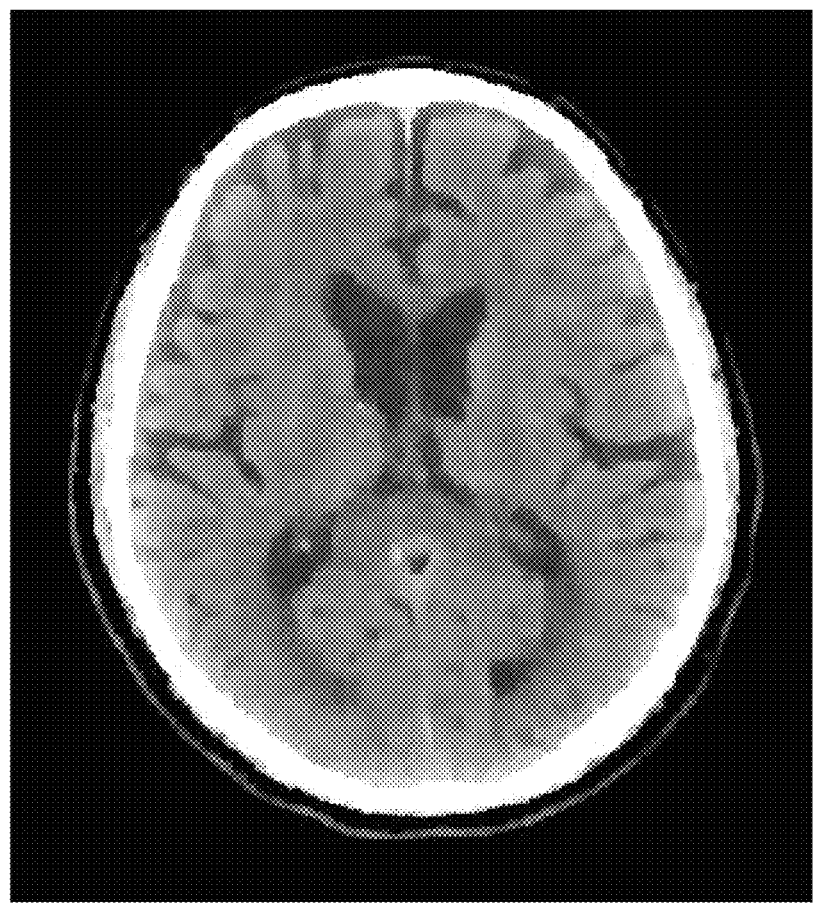
FIG. 9A shows a reference reconstructed image of a cranial section.
Figure 9B:
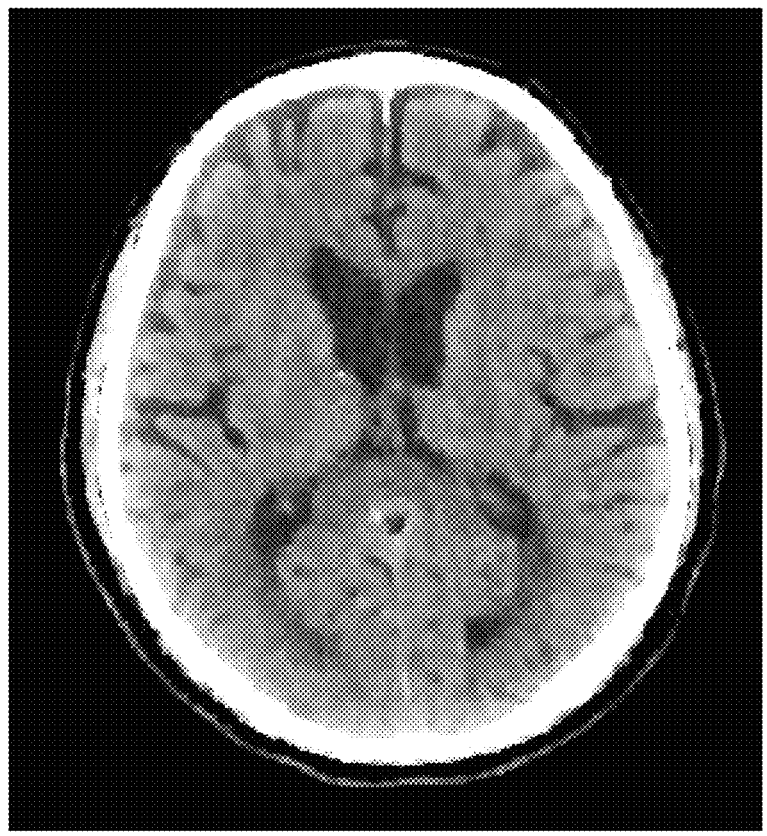
FIG. 9B shows a reconstructed image, corresponding to the reference shown in FIG. 9A after ten iterations using a combination of ordered subsets with separable quadratic surrogates and Nesterov's acceleration (OS-SQS-mom) and using 12 subsets.
Figure 9C:
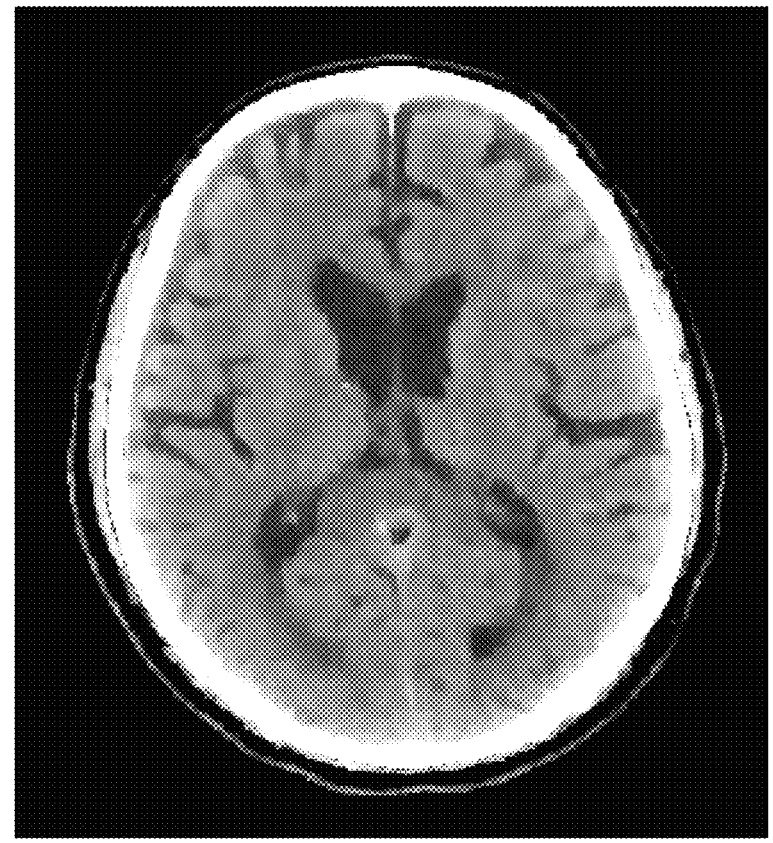
FIG. 9C shows a reconstructed image, corresponding to the reference shown in FIG. 9A, after four iterations using a variance reduction with a combination of ordered subsets with separable quadratic surrogates and Nesterov's acceleration (OS-SQS-mom-VR) and using 24 subsets.

FIG. 9A shows a reference image for a brain image. FIG. 9B shows a reconstructed image after the tenth iteration using the OS-SQS-mom algorithm, and FIG. 9C shows a reconstructed image after the fourth iteration using the OS-SQS-mom-VR algorithm. Each of the images in FIGS. 9A, 9B, and 9C started from the same FBP image. It can be observed that even after 10 iterations the image in FIG. 9B, which was generated using the OS-SQS-mom algorithm, still looks noisy because, due to limit cycle, it has not yet converged. In contrast, after only 4 iterations, the image generated using OS-SQS-mom-VR algorithm (i.e., FIG. 9C) is visually much closer to the reference in FIG. 9A.

Figure 10:
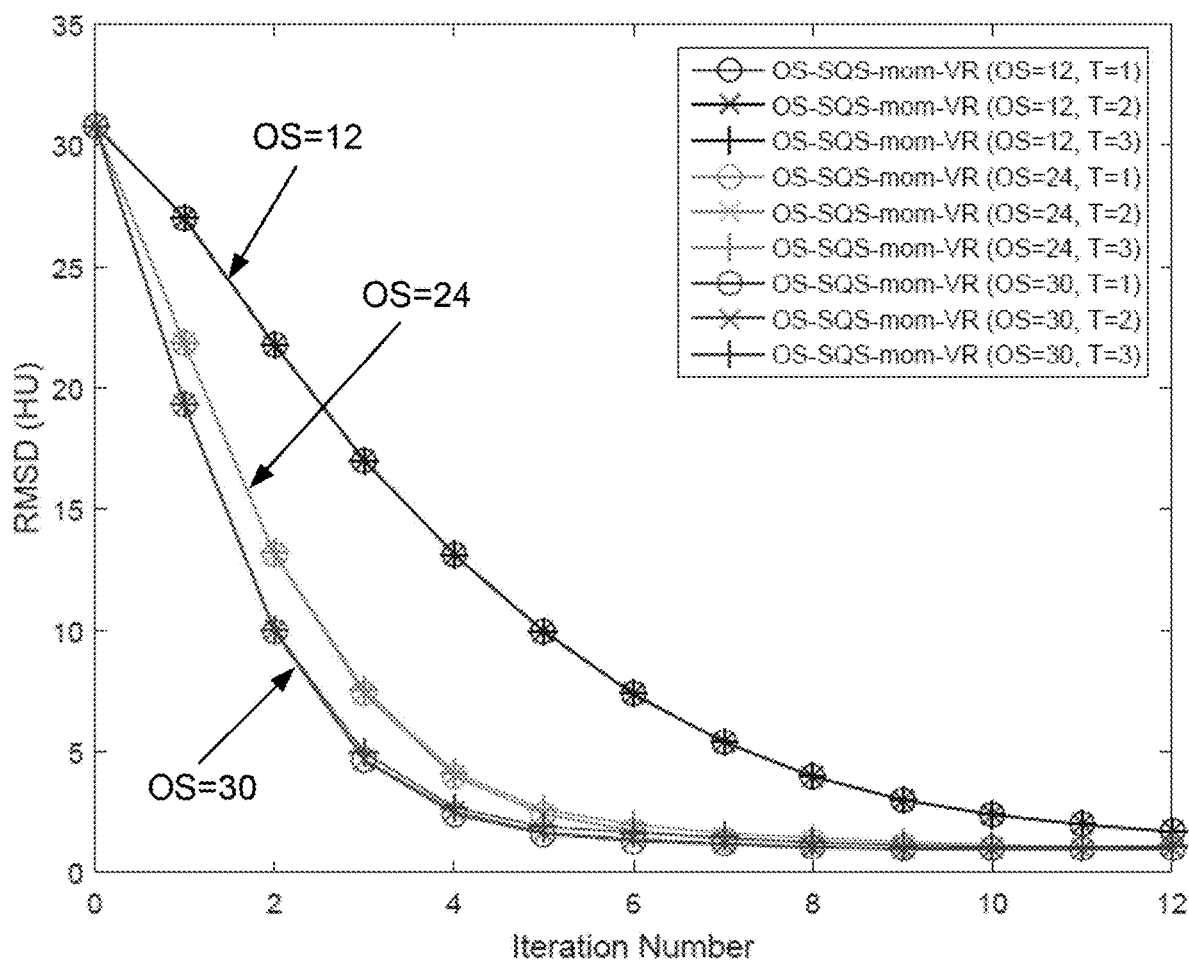
FIG. 10 shows a plot of simulation results for a convergence rate of an error when using various implementations of an OS-SQS-mom-VR IR method with different periods for updating the full gradient and different numbers of subsets, according to one implementation.

FIG. 10 shows error measurements, similar to those shown in FIG. 1B, in which both the number of subsets, OS, and the period of the full gradient calculation, T, were varied. As discussed above, in order to reduce computation cost, the full gradient update can be calculated only periodically, as opposed to calculating the full gradient for each iteration of the outer loop. Accordingly, in FIG. 10, the full gradient is updated every T iterations, where T is equal to 1, 2, and 3. The corresponding RMSD results were displayed in FIG. 10. It is observed that for a fixed number of subsets, e.g., OS=12 and 24, varying T from 1 to 3 creates almost no change to the RMSD. When 30 subsets were used, there is small difference in the RMSD, which can be observed in FIG. 10 around iterations 5 and 6. But this difference becomes indecipherable in FIG. 10 for larger numbers of iterations. Accordingly, the computational requirements can be reduced by using T>1 without significantly reducing the convergence rate as a function of the number of iterations.

Figure 11:
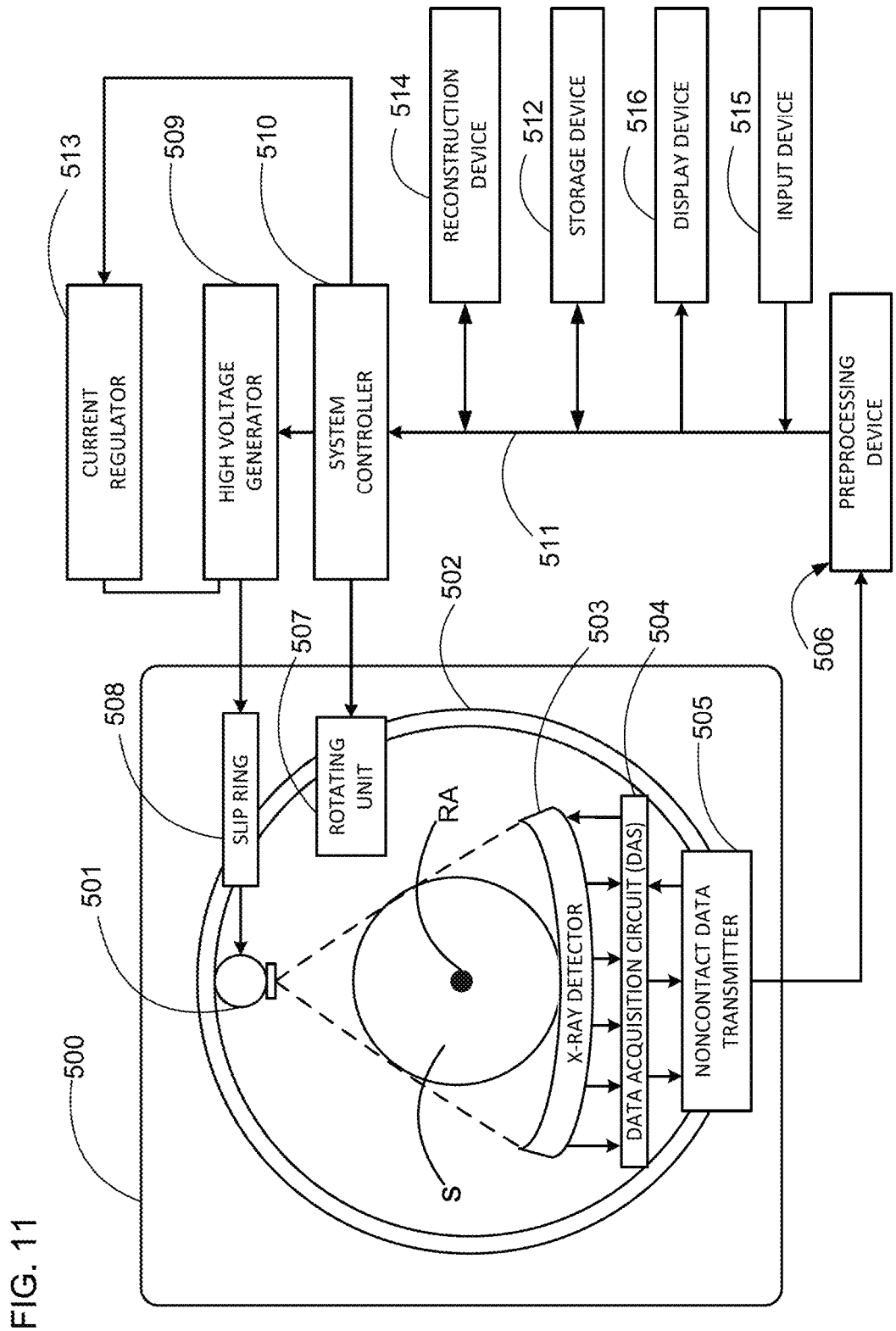
FIG. 11 shows a schematic of an implementation of a CT scanner, according to one implementation.

FIG. 11 illustrates an implementation of the radiography gantry included in a CT apparatus or scanner. As shown in FIG. 11, a radiography gantry 500 is illustrated from a side view and further includes an X-ray tube 501, an annular frame 502, and a multi-row or two-dimensional-array-type X-ray detector 503. The X-ray tube 501 and X-ray detector 503 are diametrically mounted across an object OBJ on the annular frame 502, which is rotatably supported around a rotation axis RA. A rotating unit 507 rotates the annular frame 502 at a high speed, such as 0.4 sec/rotation, while the object OBJ is being moved along the axis RA into or out of the illustrated page.

The first embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 509 that generates a tube voltage applied to the X-ray tube 501 through a slip ring 508 so that the X-ray tube 501 generates X-rays. The X-rays are emitted towards the object OBJ, whose cross sectional area is represented by a circle. For example, the X-ray tube 501 having an average X-ray energy during a first scan that is less than an average X-ray energy during a second scan. Thus, two or more scans can be obtained corresponding to different X-ray energies. The X-ray detector 503 is located at an opposite side from the X-ray tube 501 across the object OBJ for detecting the emitted X-rays that have transmitted through the object OBJ. The X-ray detector 503 further includes individual detector elements or units.

The CT apparatus further includes other devices for processing the detected signals from X-ray detector 503. A data acquisition circuit or a Data Acquisition System (DAS) 504 converts a signal output from the X-ray detector 503 for each channel into a voltage signal, amplifies the signal, and further converts the signal into a digital signal. The X-ray detector 503 and the DAS 504 are configured to handle a predetermined total number of projections per rotation (TPPR).

The above-described data is sent to a preprocessing device 506, which is housed in a console outside the radiography gantry 500 through a non-contact data transmitter 505. The preprocessing device 506 performs certain corrections, such as sensitivity correction on the raw data. A memory 512 stores the resultant data, which is also called projection data at a stage immediately before reconstruction processing. The memory 512 is connected to a system controller 510 through a data/control bus 511, together with a reconstruction device 514, input device 515, and display 516. The system controller 510 controls a current regulator 513 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 501 and the X-ray detector 503 are diametrically mounted on the annular frame 502 and are rotated around the object OBJ as the annular frame 502 is rotated about the rotation axis RA. In the fourth-generation geometry system, the detectors are fixedly placed around the patient and an X-ray tube rotates around the patient. In an alternative embodiment, the radiography gantry 500 has multiple detectors arranged on the annular frame 502, which is supported by a C-arm and a stand.

The memory 512 can store the measurement value representative of the irradiance of the X-rays at the X-ray detector unit 503. Further, the memory 512 can store a dedicated program for executing method 200 for CT image reconstruction.

The reconstruction device 514 can execute method 200. Further, reconstruction device 514 can execute pre-reconstruction processing image processing such as volume rendering processing and image difference processing as needed.

The pre-reconstruction processing of the projection data performed by the preprocessing device 506 can include correcting for detector calibrations, detector nonlinearities, and polar effects, for example.

Post-reconstruction processing performed by the reconstruction device 514 can include filtering and smoothing the image, volume rendering processing, and image difference processing as needed. The image reconstruction process can implement method 200. The reconstruction device 514 can use the memory to store, e.g., projection data, reconstructed images, calibration data and parameters, and computer programs.

The reconstruction device 514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 512 can be non-volatile, such as ROM, EPROM, EEPROM or FLASH memory. The memory 512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 516. The display 516 can be an LCD display, CRT display, plasma display, OLED, LED or any other display known in the art.

The memory 512 can be a hard disk drive, CD-ROM drive, DVD drive, FLASH drive, RAM, ROM or any other electronic storage known in the art.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   circuitry configured to
      obtain projection data representing an intensity of X-ray radiation detected at a plurality of detector elements after the X-ray radiation has been transmitted through an image volume, the projection data being partitioned into a plurality of subsets for order-subset iterative reconstruction, and each of the plurality of subsets including projection images for two or more view angles,
      initialize a reconstructed image, the reconstructed image representing X-ray attenuation within the image volume,
      calculate a first gradient representing a gradient of an objective function of more than one subset of the plurality of subsets of the projection data,
      calculate a correction term for the reconstructed image based a difference between the first gradient and a second gradient, wherein the second gradient represents a gradient of an objective function of one subset of the plurality of subsets of the projection data,
update, using the correction term, the reconstructed image, and
control a display to display the updated reconstructed image.

2. The apparatus according to claim 1, wherein the circuitry is further configured to calculate the first gradient by calculating a gradient of a total objective function, the total objective function including all subsets of the plurality of subsets, such that the first gradient is a full gradient.

3. The apparatus according to claim 1, wherein the circuitry is further configured to
perform an inner loop that includes the calculating of the correction term and the updating of the reconstructed image for each subset of the plurality of subsets,
repeat the inner loop until the calculating of the correction term and the updating of the reconstructed image for the plurality of subsets are complete, wherein
after a first iteration of the inner loop, each iteration of the inner loop performs the updating of the reconstructed image using a reconstructed image from a previous iteration.

4. The apparatus according to claim 3, wherein the circuitry is further configured to
perform an outer loop that includes
recalculating the first gradient using the updated reconstructed image, and
repeating, for each of the plurality of subsets, the inner loop using the recalculated gradient, and
repeat the outer loop to increase the convergence of the updated reconstructed image.

5. The apparatus according to claim 3, wherein the circuitry is further configured to
perform an outer loop that includes
recalculating the first gradient using the updated reconstructed image, and
repeating, for each of the plurality of subsets, the inner loop using the recalculated first gradient objective function, and
repeat the outer loop to increase the convergence of the updated reconstructed image, wherein the recalculating the first gradient using the updated reconstructed image is periodically performed in the iteration of the outer loop.

6. The apparatus according to claim 3, wherein the circuitry is further configured to further update the updated reconstructed image by
recalculating the first gradient for the updated reconstructed image, and
recalculating the correction term using the second gradient calculated for the updated reconstructed image and using the recalculated first gradient, and
updating the reconstructed image using the recalculated correction term.

7. The apparatus according to claim 1, wherein the circuitry is further configured to initialize the reconstructed image using one of a filtered back-projection method and a Feldkamp reconstruction method to generate the reconstructed image from the projection data.

8. The apparatus according to claim 1, wherein the circuitry is further configured to update the reconstructed image using Nesterov's acceleration.

9. The apparatus according to claim 1, wherein the circuitry is further configured to update the reconstructed image using a combination of a separable-quadratic-surrogates method and Nesterov's acceleration.

10. An apparatus, comprising:
an X-ray source to radiate X-rays;
a plurality of detector elements, each configured to
detect the X-ray radiation emanating from the X-ray source, after the X-ray radiation has been transmitted through an image volume, and
generate projection data representing an intensity of the X-rays detected at the plurality of detector elements, the projection data being partitioned into a plurality of subsets for order-subset iterative reconstruction, and each of the plurality of subsets including projection images for two or more view angles; and
processing circuitry configured to
initialize a reconstructed image, the reconstructed image representing X-ray attenuation within the image volume,
calculate a first gradient representing a gradient of an objective function of more than one subset of the plurality of subsets of the projection data,
calculate a correction term for the reconstructed image based on a difference between the first gradient and a second gradient, wherein the second gradient represents a gradient of an objective function of one subset of the plurality of subsets of the projection data,
update, using the correction term, the reconstructed image, and
control a display to display the updated reconstructed image.

11. A method, comprising:
obtaining projection data representing an intensity of X-ray radiation detected at a plurality of detector elements after the X-ray radiation has been transmitted through an image volume, the projection data being partitioned into a plurality of subsets for order-subset iterative reconstruction, and each of the plurality of subsets including projection images for two or more view angles;
initializing a reconstructed image, the reconstructed image representing X-ray attenuation within the image volume;
calculating a first gradient representing a gradient of an objective function of more than one subset of the plurality of subsets of the projection data;
calculating a correction term for the reconstructed image based on a difference between the first gradient and a second gradient, wherein the second gradient represents a gradient of an objective function of one subset of the plurality of subsets of the projection data; d
updating, using the correction term, the reconstructed image; and
controlling a display to display the updated reconstructed image.

12. The method according to claim 11, wherein the calculating of the first gradient is performed by calculating a gradient of a total objective function, the total objective function including all subsets of the plurality of subsets, such that the first gradient is a full gradient.

13. The method according to claim 11, further comprising
performing an inner loop for the calculating of the correction term and the updating of the reconstructed image for each subset of the plurality of subsets,
repeating the inner loop until the calculating of the correction term and the updating of the reconstructed image for the plurality of subsets are complete, wherein after a first iteration of the inner loop, each iteration of the inner loop performs the updating of the reconstructed image using the reconstructed image from a previous iteration of the inner loop.

14. The method according to claim 13, further comprising:
performing an outer loop that includes
recalculating the first gradient using the updated reconstructed image, and
repeating, for each of the plurality of subsets, the inner loop using the recalculated first gradient, and
repeating the outer loop to increase the convergence of the updated reconstructed image.

15. The method according to claim 13, further comprising:
performing an outer loop that includes
recalculating the first gradient using the updated reconstructed image; and
repeating, for each of the plurality of subsets, the inner loop using the recalculated first gradient objective function, and
repeating the outer loop to increase the convergence of the updated reconstructed image, wherein
the recalculating the first gradient using the updated reconstructed image is periodically performed in the iteration of the outer loop.

16. The method according to claim 13, further comprising updating the updated reconstructed image by recalculating the first gradient for the updated reconstructed image,
recalculating the correction term using the second gradient calculated for the updated reconstructed image and the recalculated first gradient, and
updating the reconstructed image using the recalculated correction term.

17. The method according to claim 11, wherein the initializing of the reconstructed image uses one of a filtered back-projection method and a Feldkamp reconstruction method to generate the reconstructed image from the projection data.

18. The method according to claim 11, wherein the updating of the reconstructed image is performed using Nesterov's acceleration.

19. The method according to claim 11, wherein the updating of the reconstructed image is performed using a combination of a separable-quadratic-surrogates technique method and Nesterov's acceleration.

20. A non-transitory computer readable storage medium including executable instruction, wherein the instructions, when executed by circuitry, cause the circuitry to perform the method according to claim 11.

21. The apparatus according to claim 1, wherein the circuitry is further configured to calculate the second gradient representing the gradient of the objective function of the one subset of the plurality of subsets of the projection data.

22. The apparatus according to claim 10, the processing circuitry is configured to calculate a second gradient representing the gradient of the objective function of the one subset of the plurality of subsets of the projection data.

23. The method according to claim 11, further comprising calculating a second gradient representing the gradient of the objective function of the one subset of the plurality of subsets of the projection data.

* * * * *